United States Patent [19]
Anand et al.

[11] Patent Number: 5,692,181
[45] Date of Patent: Nov. 25, 1997

[54] SYSTEM AND METHOD FOR GENERATING REPORTS FROM A COMPUTER DATABASE

[75] Inventors: Tejwansh S. Anand, Roswell, Ga.; Michael A. Georgantos, San Diego, Calif.; Yih-Shiuan Hu, Alpharetta; James F. Knutson, Roswell, both of Ga.; Drew T. Lettington; Marshall P. Lindsay, both of San Diego, Calif.; Alan J. Meyer, Riverside, Calif.; Kenneth W. O'Flaherty, Del Mar, Calif.; Richard N. Schubert, San Diego, Calif.; Peter G. Selfridge, Watchung, N.J.

[73] Assignee: NCR Corporation, Dayton, Ohio

[21] Appl. No.: 542,267

[22] Filed: Oct. 12, 1995

[51] Int. Cl.$^6$ .................................................. G06F 17/30
[52] U.S. Cl. ........................ 395/613; 395/602; 395/604
[58] Field of Search ................................. 395/601–604, 395/611, 613, 615, 201

[56] References Cited

U.S. PATENT DOCUMENTS

| | | | |
|---|---|---|---|
| 5,189,608 | 2/1993 | Lyons et al. | 395/230 |
| 5,261,093 | 11/1993 | Asmuth | 395/602 |
| 5,287,493 | 2/1994 | Jacopi | 395/604 |
| 5,455,945 | 10/1995 | Vanderdrift | 395/602 |
| 5,519,859 | 5/1996 | Grace | 395/603 |
| 5,555,365 | 9/1996 | Selby et al. | 395/335 |
| 5,557,791 | 9/1996 | Cheng et al. | 395/602 |
| 5,600,829 | 2/1997 | Tsatalos et al. | 395/602 |
| 5,603,025 | 2/1997 | Tabb et al. | 395/602 |
| 5,630,122 | 5/1997 | Kaplan et al. | 395/604 |

OTHER PUBLICATIONS

Francett, B. "Decisions, Decisions: Users Take Stock of Data Warehouse Shelves," Software Magazine, v. 14, n. 8, Aug. 1994, pp. 63–70.

"HP and Prism Solutions Integrate Products for Easy Management of Metadata–enabled Data Warehouses," Business Wire, Sep. 18, 1995.

"MicroStrategy Announces DSS Server 3.0; Three–Tier Architecture Results in Exceptional Performance and Scalability for DSS Applications," Business Wire, Aug. 8. 1995.

"MetaCube Transforms Relational Databases into High–Performance, Multi–Dimensional OLAP Servers," Business Wire, Feb. 14, 1995.

Menninger, D. "And Now, Introducing the Data Warehouse . . . (Tutorial)," Data Based Advisor, v. 12, n. 11, Nov. 1994, pp. 126–130.

"Move Over Funk & Wagnalls: The Signs on the Client–Server Highway Are Few and Far Between," InformationWeek, Apr. 25, 1994.

Gallagher, S. "How to Make Use of Raw Data (Data Warehousing)," Government Computer News, v. 14, N. 7, Apr. 3, 1995, pp. 23–26.

Frank, M. "Object–Relational Hybrids: A Look at Technology and Products That Blend Object and Relational Features," DBMS, v. 8, n. 8, Jul. 1995, pp. 46–53.

*Primary Examiner*—Thomas G. Black
*Assistant Examiner*—Maria N. Von Buhr
*Attorney, Agent, or Firm*—Paul W. Martin

[57] ABSTRACT

A system and method for generating a report for a user which allows the user to make decisions, without requiring the user to understand or interpret data itself. A method of creating data types and data relationships within a database for generating the report for the user includes the steps of organizing the data within the database into columns of tables, providing a computer coupled to the database that executes an application program that generates the report, recording a business concept by the application program, recording an attribute associated with the business concept by the application program, displaying a list of the columns of tables in the database by the computer, recording a mapping of the attribute to one of the columns in the list, displaying a list of business indicators by the computer, recording a mapping of one of the business indicators to the column, joining the attribute table with the business indicator table so that the application program can use the additional table to create the report.

1 Claim, 12 Drawing Sheets

FIG. 7

Analyst Builder

Analyst Name: [          ]

Type of Analysis: [ Change Analysis ▼ ]

Select one Measure, a set of Segments, a Base Time Period and a Comparison Time Period.

Measure(s)

Primary Measure: [ Product Share ▼ ]

Time Slice Considered

Duration: [ 3 ▼ ] [ month(s) ▼ ]

Base Period: [ 7/3/95 ] through [ 10/03/95 ]

Comparison: [ 7/3/94 ] through [ 10/3/94 ]

Segments

Defined Segments:
- All Promotions
- All Stores
- Store Age
- Store Address
- Store Square Footage
- Store Population Density
- Store Opening Date
- Store Remodeling Date
- Remodeled ?
- All Vendors

[ Add => ]   [ <= Remove ]

Report on these Segments:

Primary Segment: Store Address

130

[ Save ]  [ Save As ]  [ Report Now ]  [ Schedule Analyst ]  [ Close ]

FIG. 11

Schedule — 134

Time Interval: months

Scheduled Report/Alert
- ☐ Sales Summaries
- ☐ Sales Reports
- ☐ Theft Reports
- ☒ Inventory Alerts
- ☐ Perry Ellis Inventory June  July  Aug.  Sept.  Oct.  Nov.  Dec.

Add...  Remove  Close

SYSTEM AND METHOD FOR GENERATING REPORTS FROM A COMPUTER DATABASE

BACKGROUND OF THE INVENTION

The present invention relates to expert systems and reporting systems, and more specifically to a system and method for generating reports from a computer database from a computer database.

Storing large amounts of transaction-level data for later analysis (data warehousing) is becoming recognized as an enabler for businesses that are seeking a competitive advantage. Tightening competitive environments and global economic trends are forcing businesses and entire industries to search for a means to gain an advantage. This advantage can be realized through the use of strategic data relating to their business—allowing better and more timely decisions, leading to a better understanding of their business and support for their customers, that ultimately leads to growth. To make use of data warehouses, the data must be retrieved, organized and then presented in an understandable format.

Discovery tools are used to retrieve, analyze and present data from data warehouses. These tools can range from very complex modeling tools to relatively simple end user query tools designed to do no more than mask the complexity of the SQL programming language from the user. Automated tools that search the data for trends or relationships are also considered discovery tools.

The marketplace is comprised of various tool vendors whose products provide solutions for a portion of the entire knowledge discovery process. Therefore, to effectively utilize their data, the user community is forced to pick multiple, disjoint tools. In addition, these tools are targeted toward the expert user who has an in-depth knowledge of the data and database formats or the various analytic methods that are implemented in the tool. Existing products also do not let the business user explicitly and iteratively represent business knowledge. Finally, the output of existing tools consists of tables of numbers that users have to analyze and interpret.

Data warehouses, and databases in general, typically have complex structures organized for efficiency of data retrieval, not ease-of-use by the end user. Users, especially business users, desire reports in their vocabulary, not the vocabulary of the database. While some tools in the marketplace allow a user to define new terms and map those terms to the database, the management of related sets of new terms is not supported. That is, the relationship of a new term to existing terms is not automatically detected for the user.

In addition to these difficulties, it is common for the contents of a report to cause a user to desire another, similar report. Saving and re-using sets of related reports (re-generating the reports over a new set of data) is also desired. The generation of related reports and the re-generation of reports over new data is a capability not adequately available in the marketplace.

Therefore, it would be desirable to provide a system and method for generating reports from a computer database which allow a user to retrieve and analyze data with one tool without requiring the user to have knowledge of underlying data structures or of the SQL programming language, which allow a user to define new terms and detect and manage relationships between terms, which allow a user to easily generate related reports, and which allow a user to re-run sets of related reports over new data.

SUMMARY OF THE INVENTION

In accordance with the teachings of the present invention, a system and method for generating reports from a computer database are provided.

A method of creating data types and data relationships within a database for generating the report for the user includes the steps of organizing the data within the database into columns of tables, providing a computer coupled to the database that executes an application program that generates the report, recording a business concept by the application program, recording an attribute associated with the business concept by the application program, displaying a list of the columns of tables in the database by the computer, recording a mapping of the attribute to one of the columns in the list, displaying a list of business indicators by the computer, recording a mapping of one of the business indicators to the column, joining the attribute table with the business indicator table so that the application program can use the additional table to create the report.

It is accordingly an object of the present invention to provide a system and method for generating reports from a computer database which includes a single application or tool.

It is another object of the present invention to provide a system and method for generating reports from a computer database which allow a user to define and select variables and relationships between variables in creating a report.

It is another object of the present invention to provide a system and method for automatically detecting relationships between new terms entered by the user, and for managing these relationships in a hierarchy of related terms.

It is another object of the present invention to provide a system and method for generating related reports, and allow for the re-generation of related reports over new data.

It is another object of the invention to provide a system and method for iteratively entering business knowledge.

It is another object of the invention to provide a system that generates reports which combines natural language text, tables and graphs.

It is another object of the invention to provide a system that generates reports based on a user specified schedule or a user defined business exception.

It is another object of the invention to provide a system that is easy to use by business users who do not have knowledge of database formats, the SQL programming language and statistical or artificial intelligence based analytic methods.

It is another object of the invention to adhere to existing and emerging open systems standards.

It is another object of the invention to abstract data analysis into generic analyses. These analyses are Summarization, Change, Trend and Comparison.

BRIEF DESCRIPTION OF THE DRAWINGS

Additional benefits and advantages of the present invention will become apparent to those skilled in the art to which this invention relates from the subsequent description of the preferred embodiments and the appended claims, taken in conjunction with the accompanying drawings, in which:

FIGS. 6–12 are views of a tool for creating reports which employs a graphic user interface;

DETAILED DESCRIPTION OF THE PREFERRED EMBODIMENT

Figure 1:
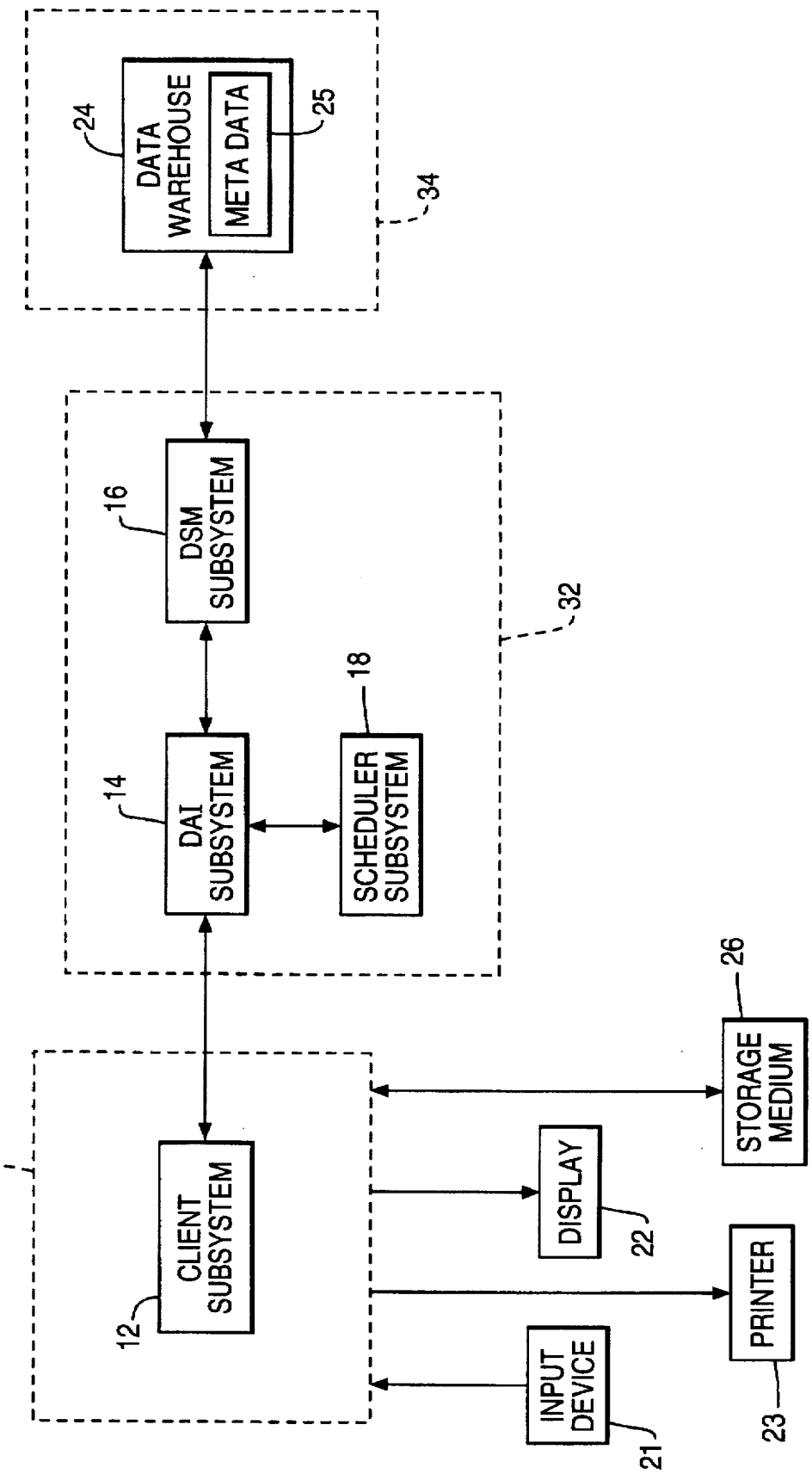
FIG. 1 is a block diagram of the system of the present invention.

Referring now to FIG. 1, system 10 includes four major subsystems: client subsystem 12, data abstraction intelligence (DAI) subsystem 14, data and schema manipulation (DSM) subsystem 16, and scheduler subsystem 18.

In connection with the description of system 10, the following definitions are provided: An Alert Condition is a user-defined condition or set of conditions that when satisfied returns an Alert Message. For instance, an Alert Condition may be defined so that when the inventory of brand A shirts drops below 200 units for a given week, system 10 produces an Alert Message.

An Alert Message is a message that notifies the user that an Alert Condition has been satisfied. From an Alert Message the user can select any number of Smart Report Definitions to run. An example of an Alert Message would be "Alert: the inventory of brand A shirts is below 200."

Art Alert Smart Report is a type of Smart Report that describes an Alert Message in detail. The Alert Smart Report has a description of what happened, when, and probable reasons why it occurred.

Business Concepts are high-level classifications within a certain business that are used to further describe indicators of the business' success (e.g., Customers, Products, Geography, Profitability). Each Business Concept has attributes that further define each Business Concept (e.g. Brand, Manufacturer, Size for the Business Concept Product).

Business Indicators are classifications across Business Concepts that are usually related to numerical values (e.g. Sales Volume, Inventory, Price). Business indicators have methods and formulae that pertain to their computation (e.g. Total Sales) and causal associations between Business Indicators (e.g. If Price increases Sales Volume should decrease). Within a Business Indicator, segments can be defined which describe a specific group of Business Indicators of interest (e.g. Senior Customer, Company A Products).

A Change Analysis Report is a compound document describing Business Indicators over two time periods. Within system 10, one can specify two periods of time and see the difference of a chosen Business Indicator for that period (e.g., How did this year's sales of textiles compare to last years sales?) Change Analysis Reports can report results for a day, week, month, quarter, year, or other defined period.

Compound Business Indicators are user-defined Business Indicators created by combining primitive Business Indicators with arithmetic and set operations.

A Data Warehouse is a very large collection of data that is housed in one or more databases. These databases usually reside on database server computers and can be either in one location or distributed geographically.

End Users are users for which system 10 is specifically designed. End users typically have knowledge of a business' operations and for this example have used Microsoft Windows (Windows 3.1, Windows NT & Windows 95). End users typically do not have expertise in SQL code generation or the specific data structures of the databases they want to access.

Enterprise Information Factory (EIF) is a commercial software package that allows typical business users to access their data warehouse data. The data warehouse is essentially a passive environment that usually requires the use of SQL code and knowledge about the structure of the database to access data. The EIF differs from the data warehouse by providing a foundation for providing tools to allow users without SQL or database knowledge to get data out of their databases.

HyperText Markup Language (HTML) is an emerging standard format for software documents that allows for the inclusion of hyperlinks and graphics (pictures, graphs, tables) in text documents. A hyperlink is a "hot" area in the document (usually text in a different color than the surrounding text), that when clicked on, shows another document that is related or linked to the original HTML document.

System Administrators are those users of system 10 who have an intimate knowledge of the databases and data structures of an organization. Often the System Administrator has the title of "database manager".

Metadata is the collection of information about the end user's particular business. After installation this information is stored in the end user's database and is used to tailor reports to the end user's particular business needs. Metadata includes, but is not limited to, Business Concepts, Business Indicators and Segments.

Object Linking and Embedding (OLE) is a computer format that allows objects (e.g., graphs, tables) in computer documents to, when double clicked on, bring up the software application that created the object (graph, table, document).

Primitive Business Indicators are Business Indicators that are directly mappable to data in the data warehouse. They are set up during installation of the present invention and are not changeable by the user.

Segments are user-defined groups that are defined within a Business Concept having a meaningful attribute in common. For instance, the a segment "Senior Customers" might be those customers whose age is greater than 65 years.

Reports are compound documents that display data from a database in text and graphics (e.g., graphs, tables). Reports are the result of running a Smart Report Definition. Smart Reports are in the HTML format and are OLE 2.0 compliant.

Smart Report Definitions are System Templates that have been customized to include particular Business Concepts, Business Indicators, and/or segments. Smart Report Definitions can be immediately "run" to produce a "Smart Report", saved to be run later or saved and scheduled to be run later.

Structured Query Language (SQL) is a structured language for viewing the contents of a relational database.

Summarization Smart Report is a type of Smart Report that shows a roll-up or summarization of a specified Business Indicator across one or more specified Business Concepts or segments. By selecting a particular Business Indicator in this report a Smart Report showing the "winners" and "losers" for the specified period can be automatically produced.

System Templates are the internal templates for Smart Report Definitions that come with system 10. System 10 provides four System Templates; Summarization, Trend Analysis, Change Analysis, and Alert Monitoring. A System Template can be customized to create a Smart Report Definition by renaming it and selecting Business Concepts, Business Indicators and a time interval for that Smart Report Definition.

A Trend Analysis Smart Report is a type of Smart Report that, when defined, shows the trend for a specific Business Indicator or indicators over a specified period of time. This analysis can aid in forecasting the future by identifying patterns in past activities.

A Comparison Analysis Smart Report is a type of Smart Report helps a business user compare the value of two Business Indicators across the same time period or compare the value of the same Business Indicator across two sibling segments across the same time period.

Client subsystem 12 is a single application program which has a graphical user interface (GUI) and which allows a user to select and specify parameters for Smart Reports, view Smart Reports, print Smart Reports, and save Smart Reports. Client subsystem 12 also displays to a user the results of performing Alerts. Finally, the user can specify Business Indicators and Segments, specify additional Alerts, or modify the schedule of Alerts client subsystem 12.

DAI subsystem 14 provides intelligent middleware for translating graphical user requests, selecting system templates, manipulating data views, and generating dimensional queries for retrieving data from data warehouse 24. It also contains rules for choosing default parameters, for choosing layout and display formats, and for generating text from data. DAI subsystem 14 is responsible for instantiating user selected Smart Reports and managing several kinds of metadata 25 used in this instantiation. This metadata 25 represents Business Concepts and Business Indicators that provide a customizable "dimensionalization" of the relational data in data warehouse 24. DAI subsystem 14 also processes updates to this metadata 25 that originate in client subsystem 12 and handles several other kinds of user updates, primarily by passing them to DSM subsystem 16.

DSM subsystem 16 reads schema from data warehouse 24, creates data views, and creates a mapping between the two. It also uses that mapping to translate the Dimensional Queries received from DAI subsystem 14 into SQL and package and return the results.

Scheduler subsystem 18 is responsible for launching Alerts and running any Smart Reports which the user specified to execute in batch mode at some specified time interval. When the requested time interval occurs, the Scheduler starts up, requests a list of Alerts and scheduled Smart Report Requests from DAI subsystem 14. From those lists, scheduler subsystem 18 determines which should be run during the current time interval and sends those requests to DAI subsystem 14 as if they were sent by client subsystem 12.

Thus, system 10 is implemented as a three-tier architecture. Client computer 30 executes client subsystem 12. Client computer 30 preferably executes Windows 3.1, Windows NT, or Windows 95, although other operating systems are also envisioned by the present invention. Client subsystem 12 (FIGS. 6-12) is suitable for use with these operating systems. Display 22 and input device 21 allow a user to view GUI and enter choices of metadata 25 used in creating Smart Reports. Input device 21 may be a keyboard, mouse, or other pointing device. Printer 23 allows a user to print a Smart Report. Storage medium 26 allows a user to store a Smart Report.

Server computer 32 executes DAI subsystem 14, DSM subsystem 16, and scheduler subsystem 18. These three subsystems combine to satisfy user requests from client subsystem 12 using information from data warehouse 24. Server computer 32 is preferably a multi-processor computer and executes the UNIX operating system or Windows NT, although other computer and operating system configurations are also envisioned by the present invention.

Client and server computers 30 and 32 are preferably coupled asynchronously for report requests; all other requests are satisfied synchronously. Communication between client and server computers 30 and 32 is preferably through transmission control protocol/internet protocol (TCP/IP), although other transmission protocols are also envisioned by the present invention.

Database computer 34 includes one or more storage media containing data warehouse 24. Database computer 34 is preferably a massively parallel processor computer and executes the UNIX operating system or Windows NT, although other computer and operating system configurations are also envisioned by the present invention. Data warehouse 24 is suited to run on any computer which supports an Open Database Connect (ODBC) interface to data warehouse 24. Communication between server computer 32 and database computer 34 is preferably via ODBC, although other database interfaces are also envisioned by the present invention.

Figure 2:
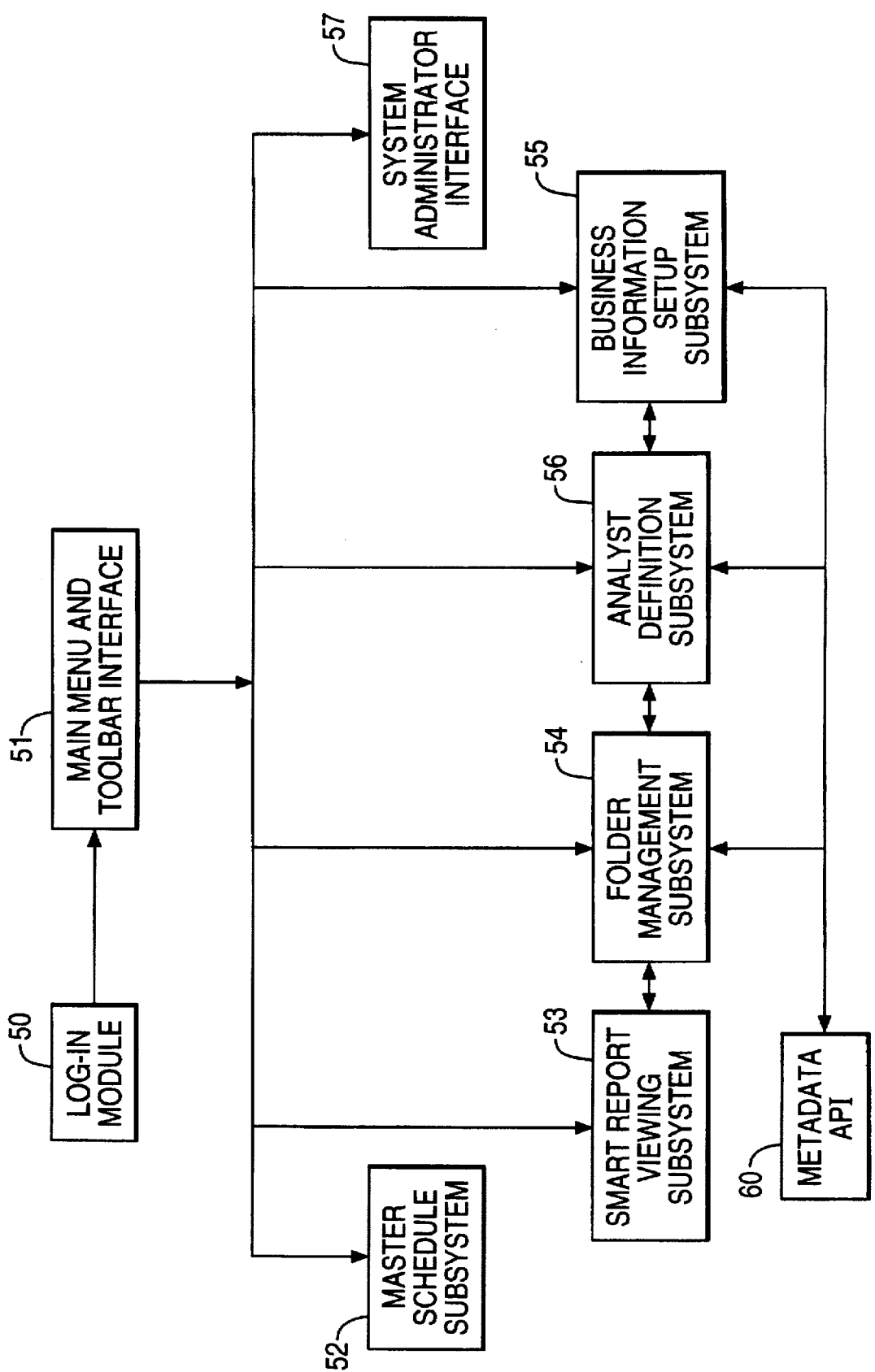
FIG. 2 is a block diagram of a client subsystem within the system of FIG. 1.

Turning now to FIG. 2, client subsystem 12 is an application program which gives a user control over system 10 and is suitable for execution on top of the Windows 3.1, Windows NT, or Windows 95 operating systems. Client subsystem 12 includes log-in module 50, folder management subsystem 54, business information setup subsystem 55, analyst definition subsystem 56, Smart Report viewing subsystem 53, master schedule subsystem 52, and System Administrator interface 57.

Log-in module 50 verifies that only one copy of the client subsystem 12 is running on computer 30, checks the localization of computer 30, connects to computer 32, and interacts with the user to log him onto client subsystem 12. During logon, log-in module 50 verifies a user's name and password and then retrieves any user preferences that may have been earlier defined. The only request from a user that is handled by log-in module 50 is a request to log onto client subsystem 12.

Log-in module 50 issues the following requests:

| | |
|---|---|
| • single program running | to Operating System (DOS, NT, Windows 95) |
| • retrieve localization | to Operating System (DOS, NT, Windows 95) |
| • connect to server | to Client/Server module |
| • disconnect from server | to Client/Server module |
| • authenticate user | to Metadata API |
| • run main menu | to Main Menu |
| • run admin menu | to System Administrator Interface |

If the user is the System Administrator, log-in module 50 displays System Administrator interface 57. If the user is a regular user, a Main menu and toolbar interface 51 are displayed.

System Administrator interface 57 is used by a System Administrator to perform system administration tasks, such as making user-defined segments available globally and creating and editing Business Concepts. Interface 57 is preferably only available to System Administrators during system installation.

Folder management subsystem 54 handles all functions related to manipulating, storing, and retrieving Folder hierarchies, and the Smart Reports and Agents that are stored in those Folders. It also handles querying from DAI subsystem 14 for newly-completed Smart Reports, both when client subsystem 12 starts up, and then periodically thereafter.

Folder management subsystem 54 also handles User requests for operations on:
Folders (new, delete, rename)
Agents (edit, delete, run now, print)
Smart Reports (view, delete, print [in cooperation with the Smart Report View Window])

Each folder is represented by one folder object. A folder stores a list of child folders, a list of Smart Reports, and a list of Agents. Folder objects are created and deleted by folder management subsystem 54 in response to user requests.

Business information setup subsystem 55 provides a user with the ability to create new measures, update measures, or delete existing measures. This information is sent to a Metadata API 60 and thereafter to DAI subsystem 14 for updating the user's Metadata 25.

Business information setup subsystem 55 provides a user with the ability to create new Segments, update segments, or delete existing Segments. This information is sent to a Metadata API 60 and thereafter to DAI subsystem 14 for updating the user's Metadata 25.

Finally, business information setup subsystem 55 provides a user with an interface to modify measure relations and to constrain measure relations. The user selects the current measure and whether to evaluate that measure's relationships when it increases or decrease. Then the user can then select from a list of other measures and define their relationship to the current measure. These relationships are in the form of "decreases", "increases", or "is unrelated to the current measure". Also, every relationship between two measures can be constrained. The relationship between measures and the constraints placed upon them are saved on computer 32 for use in generating Smart Reports.

Analyst definition subsystem 56 handles all functions related to user selection of parameters needed to generate specific reports. It also allows the user to define and schedule Alerts for scheduled reports.

The user may invoke an existing Analyst, delete one from within the folder management subsystem 54, or create a new Analyst. There are five types of Analysts are:
Summarization
Segment Comparison
Measure Comparison
Change Analysis
Trend Analysis The Summarization Analyst requires the following user selection requirements:
Analyst name
Primary measure, other optional measures
Primary segment, other segments
Time segment The Segment comparison Analyst requires the following user selection requirements:
Analyst name
Primary measure
Primary segment, a comparison segment
Time segment.

The Measure Comparison Analyst requires the following user selection requirements:
Analyst name
Primary measure, Comparison measure
Primary segment, other optional segments
base time segment, comparison time segment.

The Change Analysis Analyst requires the following user selection requirements:
Analyst name
Primary measure
Primary segment, Other optional segments
base time segment, comparison time segment.

The Trend Analysis Analyst requires the following user selection requirements:
Analyst name
Primary measure
Primary segment, other optional segments.
Time segment, Time interval.

The user is responsible for selecting one or more measures, a base period, and a comparison period. The user then can save, submit, and schedule the analyst definition. The user is restricted to choosing one Segment from within each Business Concept with the exception of Target Segment, in which case he may select only one segment and more than one child partition of the selected segment. The user may choose to schedule a Smart Report to be generated periodically. All Analyst Definition objects are scheduled. The user may modify an attached schedule.

Used for exception monitoring, all analyst Definitions will have a trigger object attached to them. If a user decides not to have any triggers, a null trigger object will be attached to Analyst Definition Object.

The Analyst definition subsystem 56 makes the following requests to the folder management subsystem 54:

| | |
|---|---|
| Save | Check if the user has selected the appropriate parameters for the selected analyst. Send a request to the folder management subsystem 54 to save an existing Analyst Definition |
| Save As | Check if the user has selected the appropriate parameters for the selected analyst. Send a request to the folder management subsystem 54 to save an existing Analyst Definition |
| Submit | Check if the User has selected the appropriate parameters for the selected analyst. Send a request to the folder management subsystem 54 to submit a report generation |

The Analyst definition subsystem also makes the following requests to Metadata API 60:

| | |
|---|---|
| Get all Measures | The request will be made to Metadata API 60 each time there is a need for it at the initialization point of a dialog |
| Get all Business Concepts | The request will be made to Metadata API 60 subsystem each time there is a need for it at the initialization point of a dialog |
| Get a Business Concept's Partitions | The request will be made depending on a user's selection of a business concept |
| Get Partitions | The request will be made depending on a user selection of a defined Segment. |
| Get Segments | The request will be made depending on a user selection of a partition. |

Smart Report viewing subsystem 53 includes a "what-you-see-is-what-you-get" (WYSIWYG) browser which displays a selected Smart Report on screen, when Smart Report viewing subsystem 53 gets a notification from folder management subsystem 54 to view a Smart Report. If the user decides to drill down from the current Smart Report, Smart Report viewing subsystem 53 notifies the folder management subsystem 54 to send a new report request.

When the user double-clicks on an Smart Report or chooses "menu item—View" from the File menu in the Inbox Manager, the folder management subsystem 54 notifies the Smart Report viewing subsystem to view the Smart Report. When the user clicks on a hypertext to drill down from the current Smart Report, the Smart Report viewing subsystem 53 passes the drill down information to the folder management subsystem 54 to send a new report request to DAI subsystem 14.

Smart Report viewing subsystem 53 includes a parser which parses the Smart Report, which is in an HTML file. In an HTML file, HTML tags indicate document elements, structure, formatting, and hypertext linking to other documents or to included media. The parser then outputs all the information for display.

The Smart Report viewing subsystem 53 allows a user to display and format text, tables, and graphs displayed by display 22 based on the information gathered by the parser. A header, a footer, and annotations can be added to a Smart Report. The user can save the viewed Smart Report. The user can also save an Smart Report as a HTML file in either UNICODE or ASCII code format. A saved HTML Smart Report can be attached to an e-mail to mail out. Any HTML version 3.0 browser can read the HTML Smart Report.

The master schedule subsystem 52 allows the user to view the scheduling of all Smart Reports. It also allows the user to add or delete a schedule from an Analyst Definition.

Master schedule subsystem 52 calls the folder management subsystem 54 to get a list of all the folders to be displayed. Then it displays in graphic form the scheduling of each Smart Report. The user can add, delete or modify a schedule and send a changed Report Definition Object back to folder management subsystem 54. concepts using metadata API 60.

Metadata API 60 handles most of the communications between client subsystem 12 and DAI subsystem 14. These communications involve four basic types of data: metadata 25, Smart Reports, user profiles, and data warehouse schema. For metadata communication, Metadata API 60 provides the ability to add, delete and update metadata 25. For Smart Reports, Metadata API 60 provides the ability to request a report, get the status of a report, retrieve a report and cancel a report request. For user profiles, Metadata API 60 provides the ability to add a user, authenticate a user and delete a user. The communication for data warehouse schema is to retrieve it.

Metadata API 60 allows a user to define new ways of looking at his business. A user cannot modify the segments that were created during installation. However, he can create new Business Indicators and new Segments. In a typical organization of users and system administrators, only system administrators can create or change business The MetaData API will handle the following requests from other client subsystems:

| update metadata | from Business Information Setup subsystem 55 |
| get report status | from Folder management subsystem 54 |
| generate report | from Folder management subsystem 54 |
| retrieve report | from Folder management subsystem 54 |
| retrieve schema | from System Administrator Interface 57 |
| update schedule | from Analyst Definition subsystem 56 |
| cancel a report | from Analyst Definition subsystem 56 |
| authenticate user | from Log-in module 50 |
| add a user | from System Administrator Interface 57 |
| delete a user | from System Administrator Interface 57 |
| update user password | from System Administrator Interface 57 |

Metadata API 60 sends the following requests directly to DAI subsystem 14:
disconnect from computer 32
send data to DAI subsystem 14
receive data from DAI subsystem 14

Figure 3:
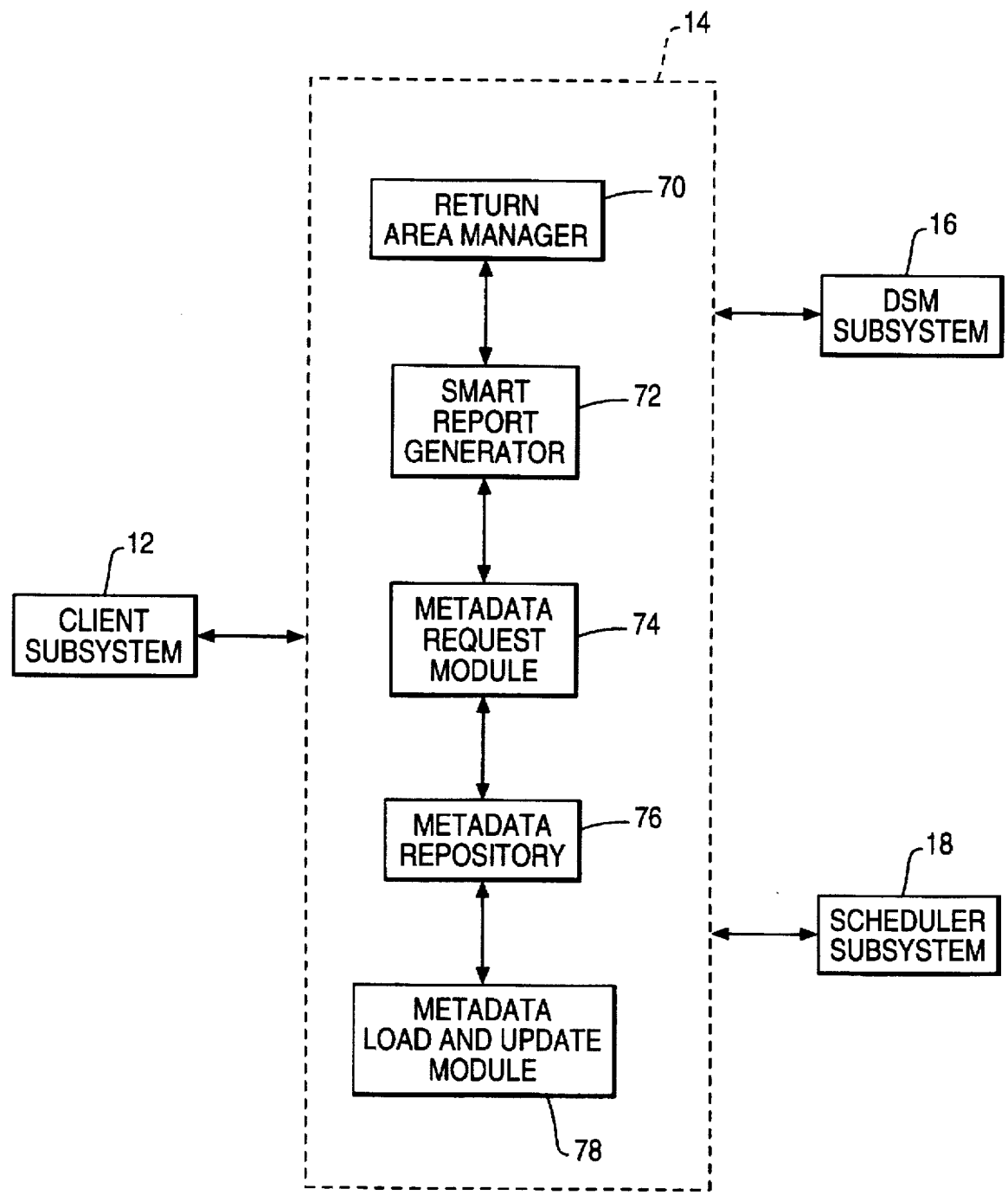
FIG. 3 is a block diagram of a data abstraction intelligence subsystem within the system of FIG. 1.

Turning now to FIG. 3, DAI subsystem 14 includes return area manager 70, Smart Report generator 72, metadata request module 74, metadata repository 76, and metadata load and update module 78.

Metadata repository 76 contains a representation of metadata 25 within data warehouse 24. This metadata 25 is the core of system 10; it provides a customizable business view over the relational data in warehouse 24 and is the primary vocabulary for the specification of Smart Reports. Metadata repository 76 gets populated at startup time by DSM subsystem 16 from the persistent metadata representation in data warehouse 24.

There are four fundamental kinds of metadata 25 in metadata repository 76, listed and described below:

Business Concepts: business concepts represent the business dimensions along which the data can be viewed. Each dimension imposes a hierarchy over the underlying data, and dimensions can be combined to drive "drill-down" or "drill-up" operations. For example, a simple retail application might have two Business Concepts: Market and Product. The Market hierarchy is composed of Sales Regions, each of which consists of several States, each of which consists of a set of Stores. The Product Hierarchy is composed of a set of Departments (Home Electronics, Men's Clothing, Hardware), each Department is composed of product Categories (Shirts, Shoes, Slacks), and each Category is composed of individual manufacturer's product lines. Time is a Business Concept that is important in all applications, and will be represented in system 10. Users can add new Business Concepts (see below). These, as all of the metadata 25 in metadata repository 76, must be mapped into relational form (that is, into SQL) in order to actually query data warehouse 24. Mapping is done by DSM subsystem 16 during the process of processing Dimensional Queries (see below).

Business Indicators: Business Indicators are the important measures of data of interest. For example, product Volume, Price, or Current Stock are all Business Indicators. The use of time in a query further refines the idea of a Business Indicator; for example, "Change in Volume" applies between two time periods.

Alerts: Alerts are essentially tests over the data, stated in terms of Business Concepts and Business Indicators, and are typically used to generate Exception Monitoring Smart Reports. For example, a user might specify that if the available stock of a product falls by some percentage, to generate the appropriate Smart Report. The user also specifies how often to check the Alert condition. A list of Alerts is maintained by DAI subsystem 14 and executed by scheduler subsystem 18. This metadata 25 is also available to DAI subsystem 14 and is used to generate Smart Report information.

Causal Indicators: Causal Indicators are simple expressions of business causality; for example, "Increased Sales mean Increased Profit". This kind of metadata 25 is used to generate supporting information for a Smart Report or, alternatively, alert the user to trends that run counter to the set of Causal Indicators.

Metadata 25 is initially created during installation of the present invention at the customer's site. The process of creating the metadata 25 is illustrated in more detail in FIG. 7. What is included within metadata 25 depends on the industry (some metadata 25 will be industry-specific and usable by all companies in that industry), the specific customer of the present invention, and the structure of the customer's data warehouse 24. During installation, some industry-specific metadata 25 is used, some company specific metadata 25 may be created, and the mapping information needed to map metadata 25 to data warehouse 24 is created. All metadata 25, including the mapping information, is stored in a set of relational tables. These relational tables are kept in data warehouse 24 and used by the present invention to create reports for the user.

Metadata request module 74 handles all requests for metadata 25, either from client subsystem 12 or DAI subsystem 14. Client subsystem 12 requests metadata 25 from DAI subsystem 14 to be presented to the end users. Smart Report generator 72 requests metadata 25 in order to create Dimensional Queries as part of instantiating a Smart Report for a user. A request for metadata 25 might be, for example, a request for all sub-concepts of a particular Business Concept.

Metadata request module 74 also handles metadata updates from client subsystem 12. A user adds new Segments by specifying a new dimension from which to group the data. This dimension must be supported by an existing data attribute in the warehouse data. For example, a Product may include a List-Price and a Discount-Price. The user can specify a new dimension called "Discount-Factor", specified using the percent difference between the Discount-Price and the List-Price, and use that to create three new Segments: Heavily-Discounted Products, Slightly-Discounted Products, and Non-Discounted Products. These new Segments can now be used in subsequent Smart Report requests, and, if indicated by the user, made persistent by writing them back into data warehouse 24 by metadata load and update module 78.

Request Structures are passed from one subsystem to another when one subsystem requires processing and results from another. Request Structures vary according to the type of request being sent. Most requests, however, have some common attributes, such as an identification field, an owner, a name and a description of the request.

Request Structures primarily include Alert Evaluation Requests and Alert Update Requests. Alert Evaluation Requests are sent from client subsystem 12 to DAI subsystem 14. Alert Evaluation Requests are requests to evaluate an Alert condition to determine if it is true. The request has the following format:
AE_ID: ID which uniquely identifies this Alert Evaluation
OWNER: The user who created this Alert Evaluation
AE_NAME: The name of this Alert Evaluation
AE_DESC: The description of this Alert Evaluation
ALERT_ID: The Alert which contains the condition for evaluation Alert Update Requests are sent from client subsystem 12 to DAI subsystem 14. This type of request is to schedule a new Alert. The request has the following format:
ALERT_ID: ID which uniquely identifies this Alert
OWNER: The user who created this Alert
ALERT_NAME: The name of this Alert
ALERT_DESC: The description of this Alert
SEG_ID: A segment specified for this Alert
BI_ID: A Business Indicator specified for this Alert
OP: The operator for this Alert
THRESHOLD: The threshold value which triggers the Alert
ENABLED: Specifies if the Alert is currently enabled or disabled
START: The starting date for the Alert
INTERVAL: How often should the Alert be checked Business Concept Update Requests are sent from client subsystem 12 to DAI subsystem 14 and are preferably issued only by the System Administrator. Business Concept Update Requests are requests for adding a new Business Concept to the metadata 25. The requests have the following format:
BC_ID: ID which uniquely identifies this Business Concept
BC_NAME: The name of this Business Concept
BC_DESC: The description of this Business Concept
MAPPING: Mapping of this Business Concept to data warehouse tables Business Indicator Update Requests are sent from client subsystem 12 to DAI subsystem 14. Business Indicator Update Requests are requests for adding a new Business Indicator to the metadata 25.

Business Indicator Update Requests primarily include primitive and compound requests. Primitive requests have the following format:
BI_ID: ID which uniquely identifies this Business Indicator
OWNER: The user who created this Business Indicator
BI_NAME: The name of this Business Indicator
BI_DESC: The description of this Business Indicator
MAPPING: Mapping of this Business Indicator to data warehouse tables
ROLLUP_OP: Operator for performing the roll-up operation Compound requests have the following format:
BI_ID: ID which uniquely identifies this Business Indicator
BI_NAME: The name of this Business Indicator
BI_DESC: The description of this Business Indicator
EXP: The expression which describes this Business Indicator function Causal Indicator Update Requests are sent from client subsystem 12 to DAI subsystem 14. Causal Indicator Update Requests add a new Causal Indicator to the metadata 25. The request has the following format:
CI_ID: ID which uniquely identifies this Casual Indicator
OWNER: The user who created this Causal Indicator
CI_NAME: The name of this Causal Indicator
CI_DESC: The description of this Causal Indicator
BI_ID1: Business Indicator which is the independent variable of this causal relationship
OP: The operator for this causal relationship
BI_ID2: Business Indicator which is the dependent variable of this causal relationship
RANGE: When OP is +/−, the range where it is + and the range where it is −

Schema Requests are sent from client subsystem 12 to DAI subsystem 14 and may only be issued by the System Administrator. Schema Requests are requests to retrieve the data base schema from data warehouse 24. This type of request is just a simple unformated message to DAI subsystem 14.

Segment Update Requests are sent from client subsystem 12 to DAI subsystem 14. Segment Update Requests are requests for adding a new Segment to the metadata 25. Segment Update Requests have the following format:

SEG_ID: ID which uniquely identifies this Segment
OWNER: The user who created this Segment
SEG_NAME: The name of this Segment
SEG_DESC: The description of this Segment
SEG_LEVEL: Level in the Segment Hierarchy of this Segment
BC_ID: The Business Concept for this Segment
ATTR_ID: The Attribute(s) for this Segment
OP: The operator(s) for this Segment
VALUE: The value (s) for this Segment Smart Report Requests are sent from the Client subsystem to the DAI subsystem. This type of request is to create a new Smart Report based on user specified selections. The request has the following format:

SR_ID: ID which uniquely identifies this Smart Report
OWNER: The user who created this Smart Report
SR_NAME: The name of this Smart Report
SR_DESC: The description of this Smart Report
SR_TYPE: One of the four types of Smart Reports
BC_ID: The Business Concept for this Smart Report
SEG_ID: The Segment(s) for this Smart Report
TIME: The time interval(s) for this Smart Report Dimensional Queries are sent from DAI subsystem 14 to DSM subsystem 16. Dimensional Queries formulate requests for data from data warehouse 24. DSM subsystem 16 converts Dimensional Queries into SQL statements. A Dimensional Query conforms to the following format:

| | |
|---|---|
| dq | concept_list ';' indicator ';' time |
| concept | CONCEPT_NAME ':' SEGMENT_NAME |
| concept_list | concept |
| | concept_list ',' concept |
| indicator | INDICATOR_NAME |
| time | INTERVAL_NAME |

Client subsystem 12 produces the following outputs to DAI subsystem 14:
Alert Evaluation Requests
Alert Update Requests
Business Concept Update Requests
Business Indicator Update Requests
Causal Indicator Update Requests
Schema Requests
Segment Update Requests
Smart Report Requests
Cancel Requests DAI subsystem 14 provides the following outputs to client subsystem 12:
Alert Evaluation Structures
Alert Structures
Business Concept Structures
Business Indicator Structures
Causal Indicator Structures
Schema Structures
Segment Structures
Smart Reports
Retrieve Alert Evaluations Requests
Retrieve Smart Reports Requests
Error/Status Codes DAI subsystem 14 provides the following outputs to scheduler subsystem 18:
Alert Evaluation Lists
Scheduled Smart Report Lists
Alert Evaluation Structures
Smart Reports
Retrieve Alert Evaluations Requests
Retrieve Smart Reports Requests DAI subsystem 14 provides the following outputs to DSM subsystem 16:
Dimensional Queries
Metadata Retrieval Requests DSM subsystem 16 provides the following outputs to DAI subsystem 14:
Updated Metadata
Data from the Data Warehouse DSM subsystem 16 provides the following outputs to data warehouse 24:
SQL Statements DSM subsystem 16 receives the following inputs from data warehouse 24:
Metadata
Database Schema
Warehouse Data Scheduler 18 provides the following outputs to DAI subsystem 14:
Alert Evaluation Requests
Smart Report Requests Metadata load and update module 78 populates metadata repository 76 from the persistent metadata stored in data warehouse 24 upon system startup. In addition, when a user specifies new Business Concepts and indicates that he wants them saved, metadata load and update module 78 writes them back into data warehouse 24 for future use.

Smart Report generator 72 fulfills the primary purpose of DAI subsystem 14. Report generation begins when a user chooses a Smart Report and an appropriate set of parameters in client subsystem 12. This Smart Report Request is used to first fetch a System Template. A System Template consists of a set of Abstract Queries. An Abstract Query contains placeholders for Business Concepts and Business Indicators that are filled in with the user selections in the process of instantiation, as well as conditions that are evaluated to generate different output and actual layout information. The output of the Report Generation process is a fully instantiated Smart Report returned to client subsystem 12 in the form of HyperText Markup Language (HTML), a widely-used standard for building WYSIWYG compound documents.

Smart Report generator 72 has several kinds of knowledge:
Knowledge of how to map Abstract Queries into Dimensional Queries
Knowledge of how to use metadata 25 to generate default choices (choices not made by the user in the Smart Report Request)
Knowledge of how to use both metadata 25 and data returned from the warehouse to guide the selection of both text components
Knowledge of how to use both metadata 25 and data returned from the warehouse to guide the selection of different types of graphical presentations.

For example, the Summary Smart Report may take as arguments a Business Concept, a Business Indicator, and a time period. It may also contain an Abstract Query that says "Retrieve the Target-Business-Indicator for the Target-Concept at the Target-Time-Period". The Report Generation Module uses the user selected parameters, for example, the Business Concept "Product", the Business Concept Segment "Men's Shirts", the Business Indicator "Volume", and the time period "December 1994" to create a Dimensional Query. This Dimensional Query is sent to the Data and Schema Manipulation subsystem, which translates this query into SQL and actually executes it. It returns the computed data to DAI subsystem 14, where other Abstract Queries might embed the actual number in a bullet.

Other Abstract Queries have conditionals associated with them. To build off the previous example, another part of the summary System Template might specify the creation of a graph, showing how the target-business-indicator (volume) is apportioned among the segments of the target-business-concept (shirts). In this case, report generator 72 makes a metadata request to return the set of segments, in this example, the dimension that specifies the shirt manufacturer. All volume information is requested for each manufacturer of shirts. Now, additional information guides report generator 72 in the selection of a choice of graph. For example, if the number of segments (manufacturers in this case) is small, like 7 or less, then a pie graph is appropriate, otherwise, a bar graph is preferred. If the number of segments is very large, then aggregate the bottom 20 percent (in terms of the Business Indicator, in this case, Volume) and use that aggregate with the label "Other" in the graph.

Return area manager 70 keeps track of Smart Reports and Alert Evaluations with positive results by user that are waiting for delivery to client subsystem 12. When a user logs into system 10, client subsystem 12 issues a request to DAI subsystem 14 to return all data for that user in the return area. Return area manager 70 retrieves the information from the return area on server computer 32 and sends it back to client computer 30 through DAI subsystem 14.

Figure 4:
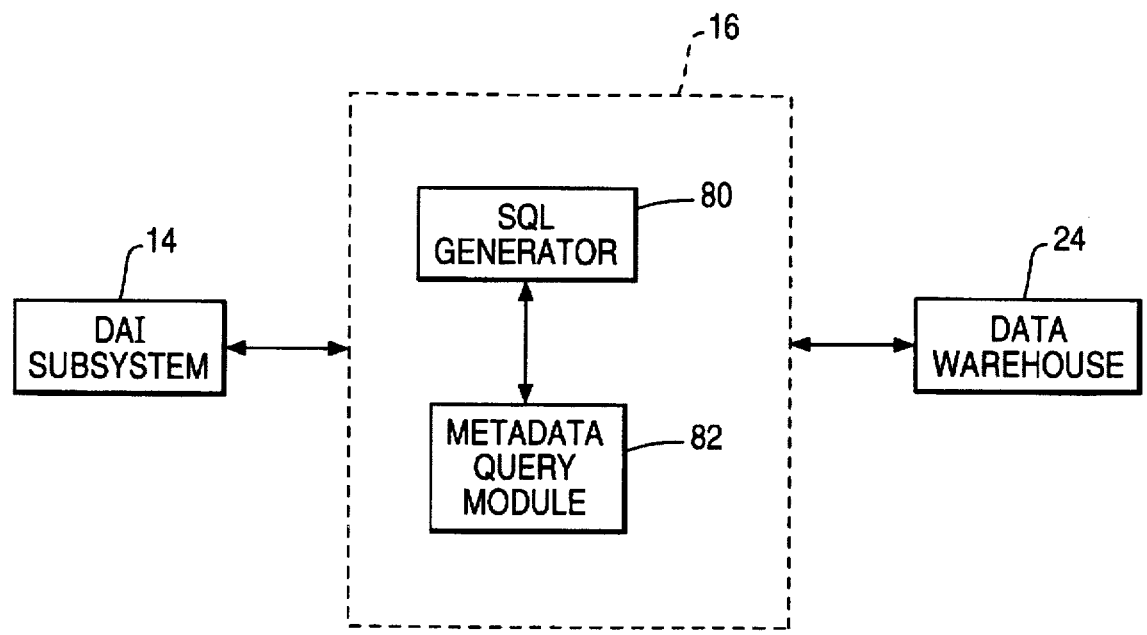
FIG. 4 is a block diagram of a data and schema manipulation subsystem within the system of FIG. 1.

Turning now to FIG. 4, DSM subsystem 16 includes SQL generator 80 and metadata query module 82.

SQL generator 80 translates dimensional queries received from DAI subsystem 14 into SQL statements used to retrieve data from data warehouse 24. A mapping from business concepts to database entities is stored in the metadata 25 and is used in the formatting of the SQL statements. SQL generator 80 provides to DAI subsystem 14 for use in creating Smart Reports.

Metadata query generator 82 processes requests for metadata 25 submitted by DAI subsystem 14. At system startup, DAI subsystem 14 requests all metadata 25 in order to initialize the knowledge base. Metadata query generator 82 is also invoked whenever the user modifies his Segments, causing DAI subsystem 14 to issue an update metadata request.

Figure 5:
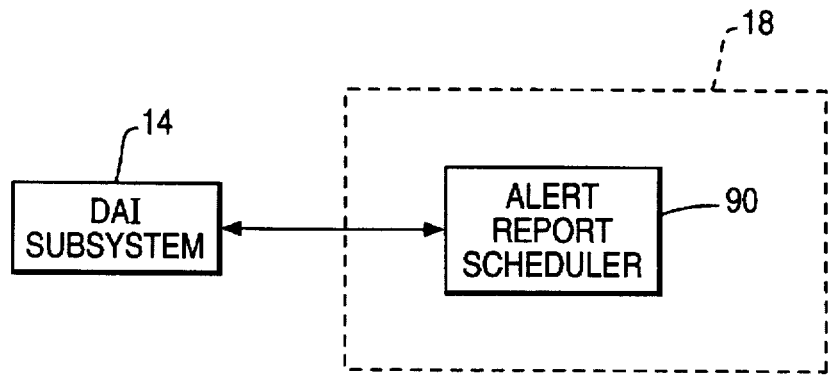
FIG. 5 is a block diagram of a scheduler subsystem within the system of FIG. 1.

Turning now to FIG. 5, scheduler subsystem 18 includes alert and report scheduler 90 schedules processes to run at user specified times of day and at user specified intervals which are selected at system installation time by the System Administrator. Alert and report scheduler 90 issues Smart Report requests to DAI subsystem 14 for all batch-scheduled Smart Reports. Alert and report scheduler 90 also issues Alert Evaluation Requests to DAI subsystem 14 when it runs. If the Alert Evaluation condition is true, the user will be notified the next time he logs into system 10.

Turning now to FIGS. 6–12, client subsystem 12 and its operation are illustrated in more detail.

Figure 6:
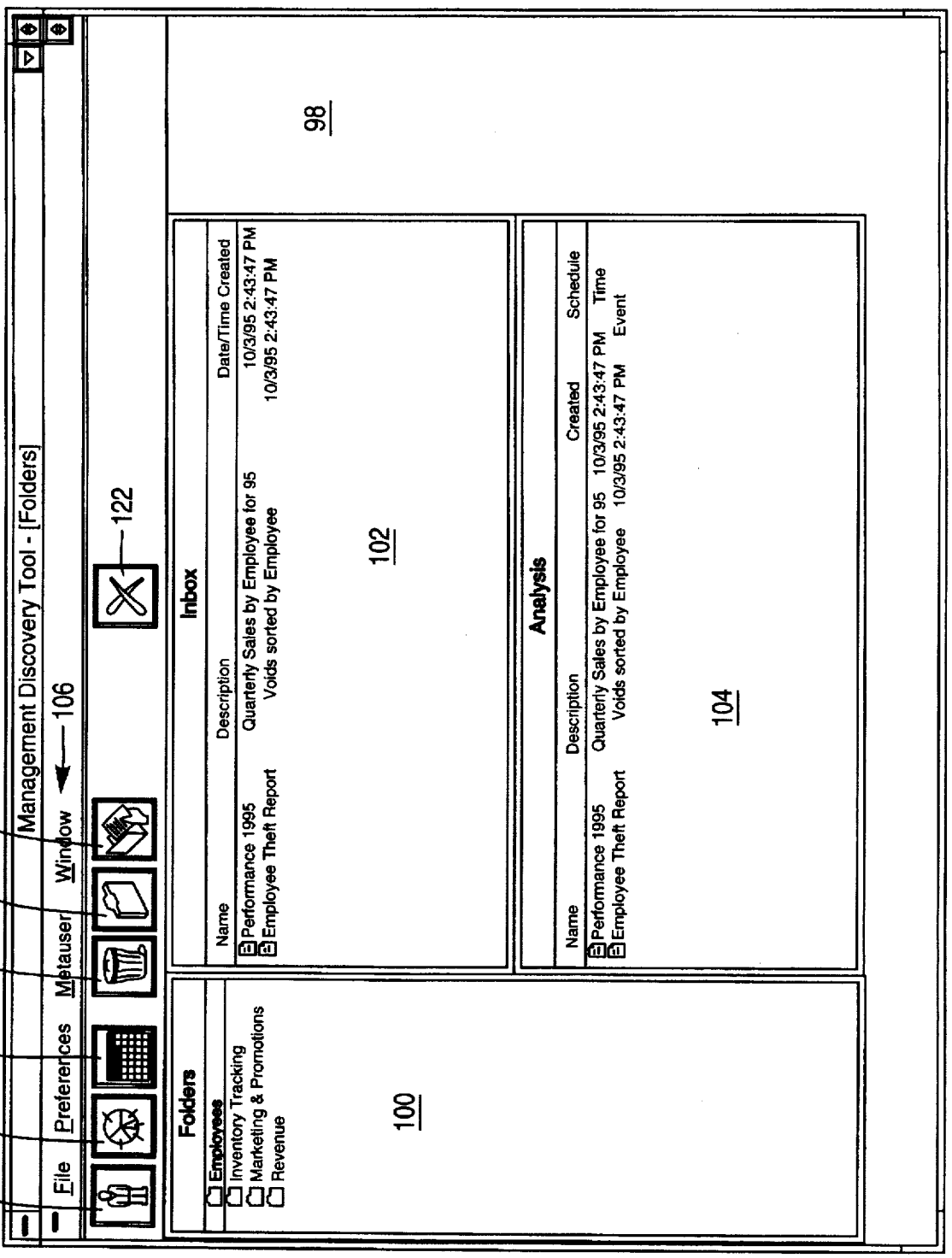

Client subsystem 12 includes a primary overlay 98 which appears when client subsystem 12 is executed. Overlay 98 includes three display areas 100–104 within a common Folders window, pull-down menus 106, and buttons 110–120. The Folders window may be maximized (as it is shown in FIG. 6) to eliminate its borders, resized, or minimized as an icon within client subsystem 12. The Folders window cannot be closed.

Display area 100 contains a list of folders, which represent the metaphor used by client subsystem 12 in organizing Smart Reports and the analysis that creates them. A folder is opened by highlighting it and selecting it with input device 21. The first folder in the list is opened by default when client subsystem 12 is executed.

Figure 12:
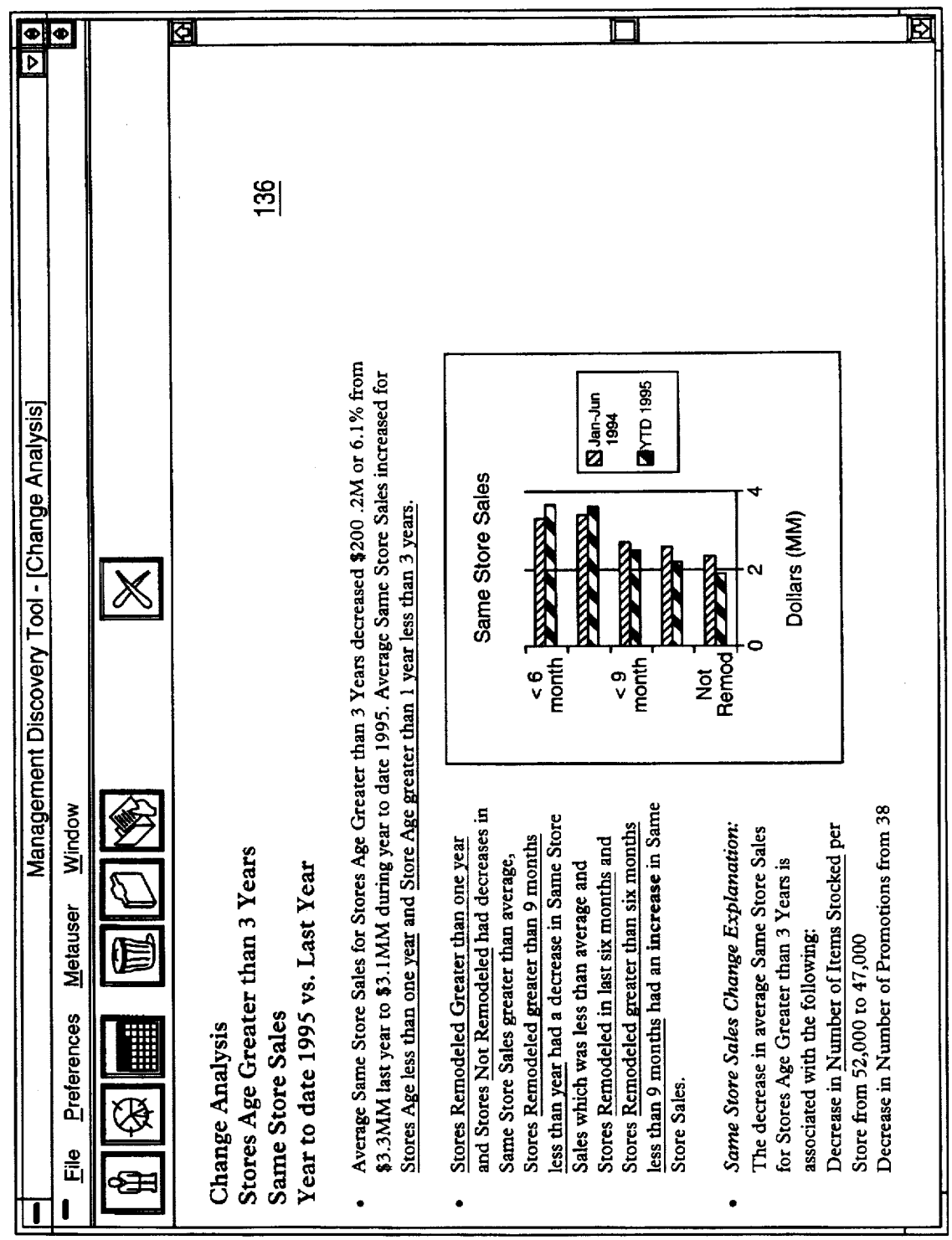

Display area 102 contains a list of Smart Reports within a selected folder. A Smart Report may be viewed by highlighting it and selecting it with input device 21. An Analysis window 136 appears containing the Smart Report. The title bar of the window indicates the type of preselected analysis that has been performed. For example, in FIG. 12, "change" analysis was preselected by a user to be the type of analysis to run. The Analysis window 136 may be maximized (as it is shown in FIG. 12) to eliminate its borders, resized, or minimized as an icon within client subsystem 12. The Analysis window 136 may be closed by selecting button 122 (FIG. 6) or by a manner well known to users of Windows 3.1 and other windows operating environments.

Display area 104 contains a list of Analysts within a selected folder. An Analyst is a personification of preselected operations performed on preselected data for the purpose of generating a Smart Report. An Analyst may be viewed by highlighting it and selecting it with input device 21. An Analyst Builder window 130 (FIG. 7) appears containing the preselected settings saved within the Analyst and used to generate the corresponding Smart Report listed in display area 102. (The Smart Reports listed in display area 102 are arranged in the same order as the Analysts listed in display area 104, and have the same titles as the corresponding Analysts). The Analyst Builder window 130 may be not be maximized, resized, or minimized as an icon; it may only be closed in a manner well known to users of Windows 3.1 and other windows operating environments.

Buttons 110–122 (FIG. 6) implement the primary operational commands within pull-down menus 106 and are activated using a pointing device. Button 110 calls the Analyst Builder window 130 (FIG. 7).

Figure 8:
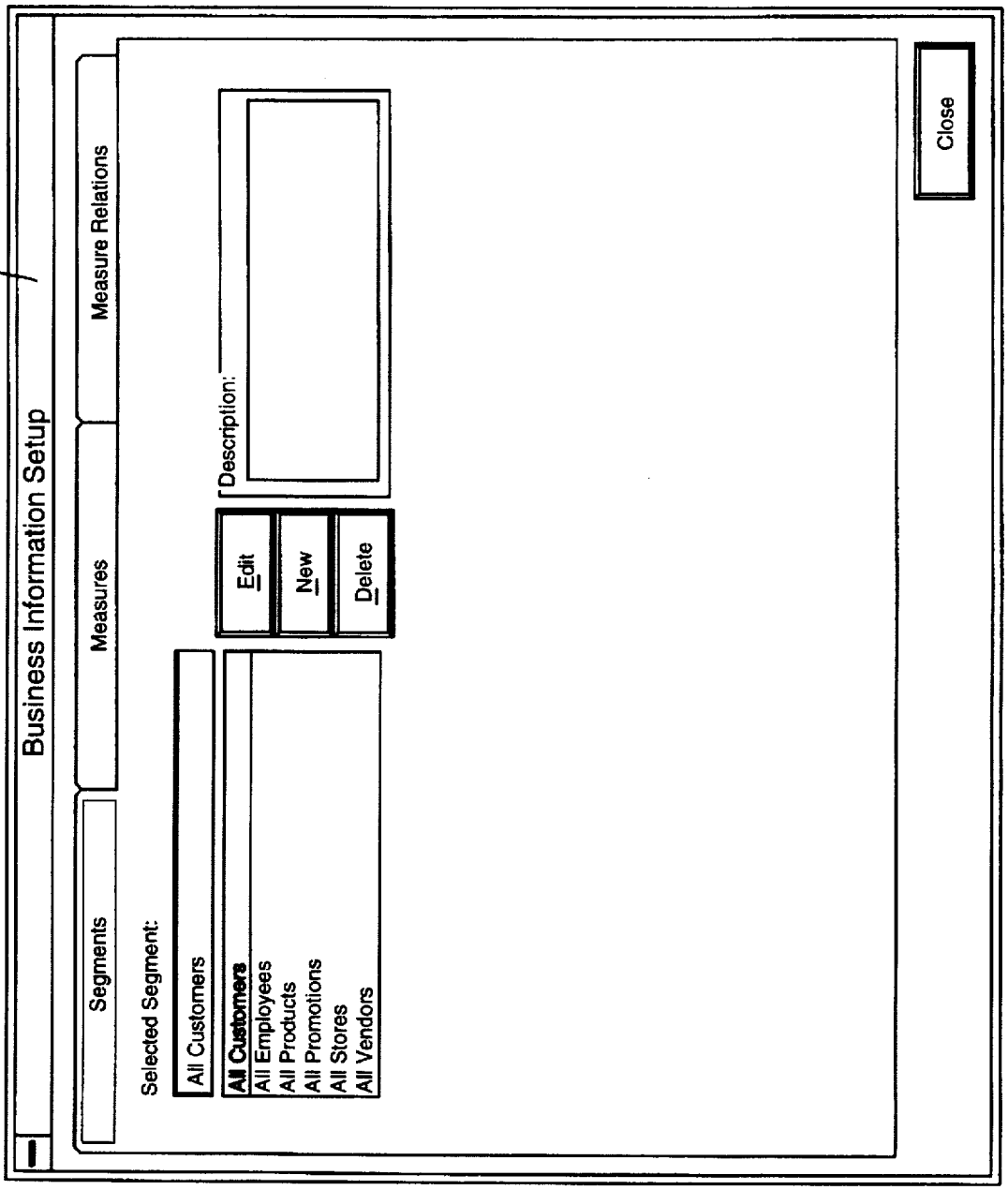

Button 112 calls a Segments divider within a Business Information Setup window 132 (FIG. 8).

Button 114 calls a Schedule window 134 (FIG. 11).

Button 116 deletes a selected file or folder within display areas 100–104.

Button 118 creates a new folder.

Button 120 calls the Analysis window 136 with a selected Smart Report from display area 102.

Button 122 closes client subsystem 12.

Button 122 (when in FIG. 12) closes the Analysis window 136.

Button 120 (when in FIG. 12) causes a previous Smart Report to be displayed.

With reference to FIG. 7, Analyst Builder window 130 allows a user to define how selected data is analyzed. An Analyst is named under the Analyst Name field. A type of analysis is chosen under the Type of Analysis field. A primary measure to be used in implementing the analysis is chosen under the Primary Measure field. Segments to be reported on are chosen from the list of Defined Segments. Finally, a period for the Smart Report is defined under the Time Slice Considered fields. A Smart Report can be created immediately by selecting the Report Now button, or can be scheduled as part of a batch of Smart Reports by selecting the Schedule Analyst button.

With reference to FIG. 8, the Segments divider within the Business Information Setup window 132 allows Segments to be created, modified, or deleted. A description of the segment appears in the Description field.

Figure 9:
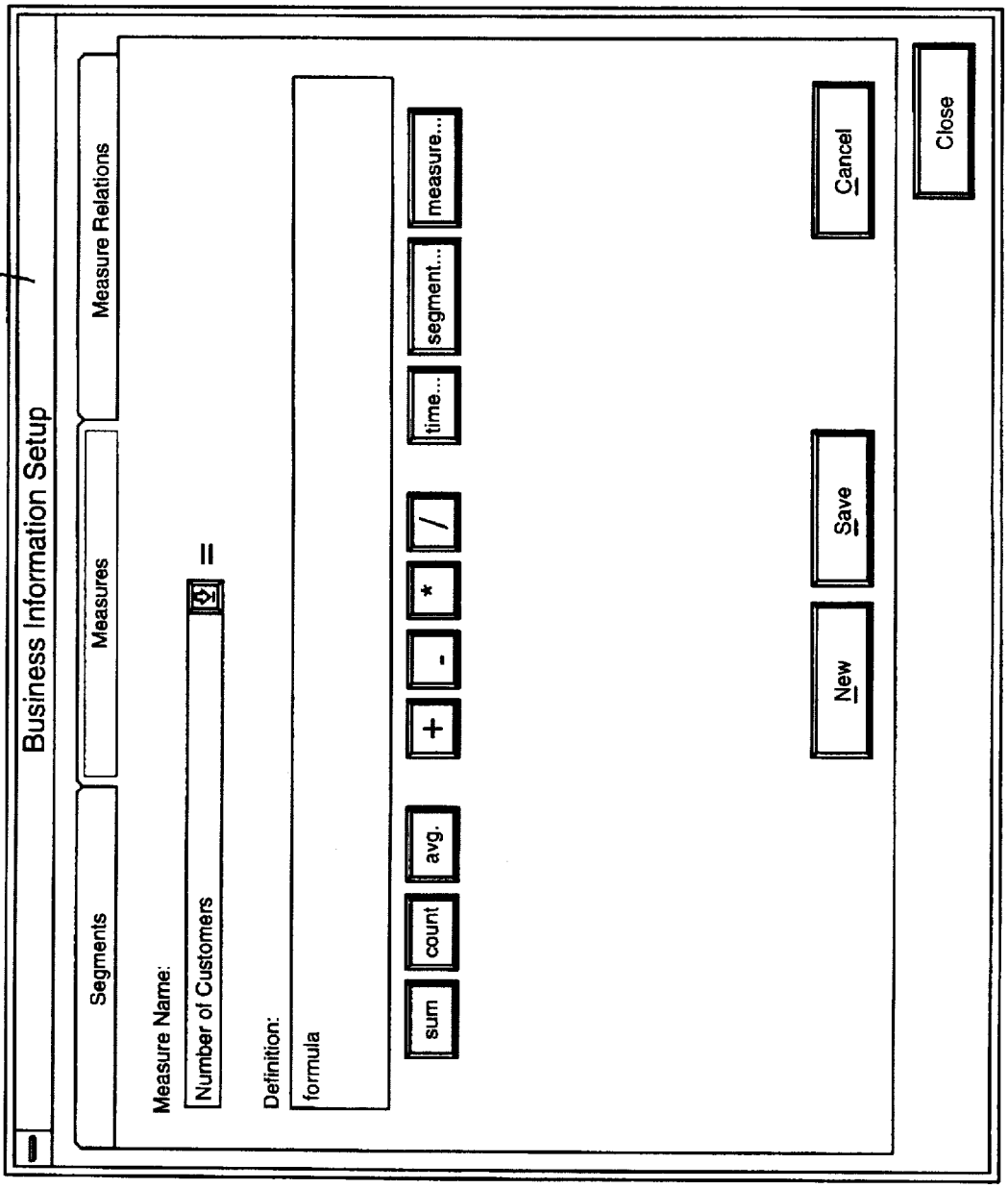

With reference to FIG. 9, Measures of information may be created and modified within the Measures divider of the Business Information Setup window 132. A name for each Measure appears in the Measure Name field. A definition of a Measure appears in the Definition field. Mathematical operators, Time Slice constraints, Segment constraints, and constraints from other Measures may be inserted into the Definition using the corresponding buttons below the Definition field.

Figure 10:
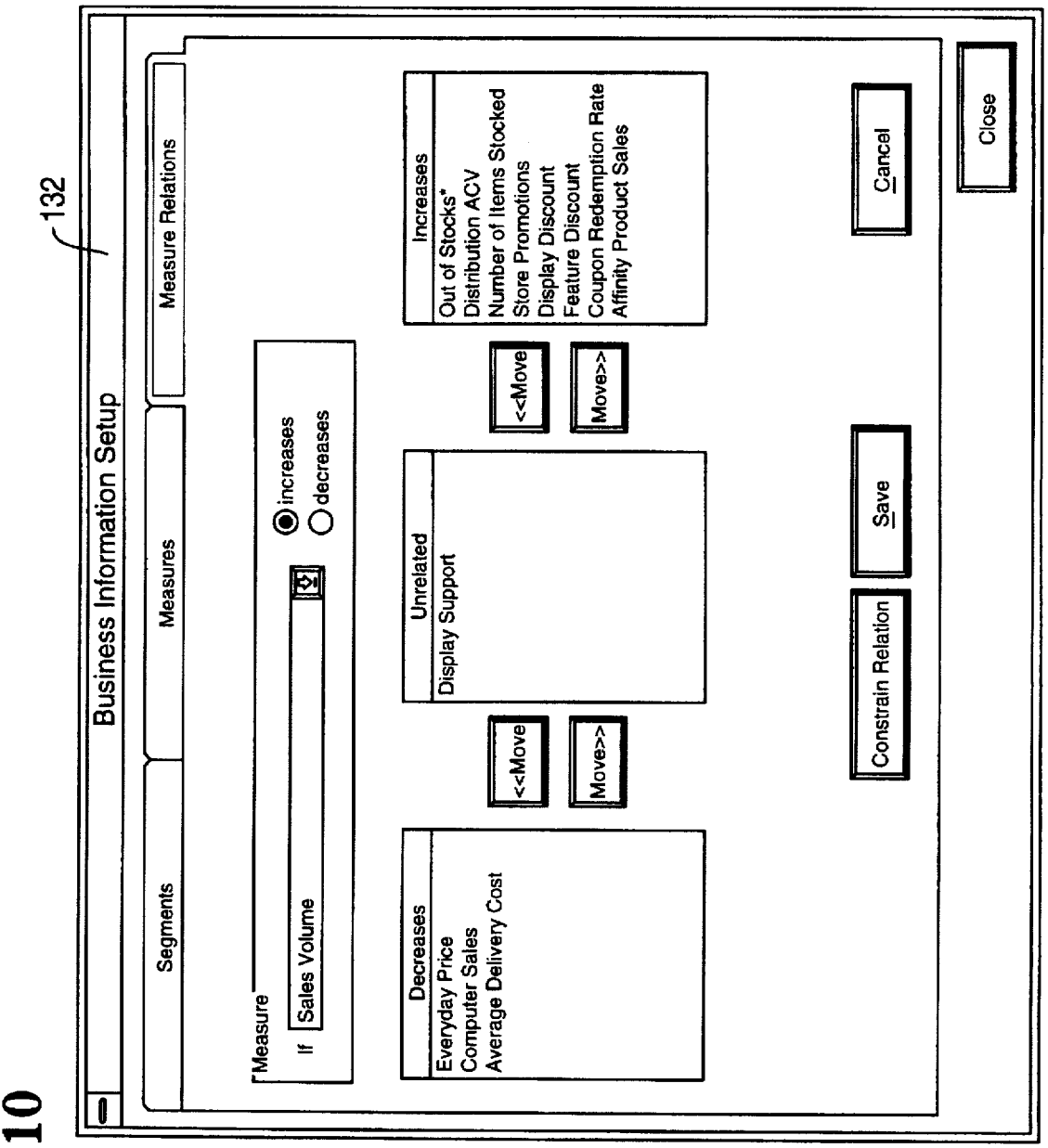

With reference to FIG. 10, Measure relationships may be defined and modified within the Measure Relations divider of the Business Information Setup window 132. Measure relationships are defined in terms of an if-then statement. A primary measure and whether it increases or decreases is selected in the Measure field, which represents the "If" part of the If-Then statement. Measures within the Unrelated field may be moved to either the Decreases field or the Increases field to form the "Then" part of the If-Then statement.

With reference to FIG. 11, production of Smart Reports and Alerts may be scheduled using the Schedule window 134. A batch of Smart Reports may be individually scheduled for automatic production. Scheduling of Smart Reports is particularly useful to those users that require periodic Smart Reports. Smart Report time intervals may be selected under the Time Interval field, which provides daily, weekly, and monthly reporting options.

With reference to FIG. 12, a sample Smart Report is shown within Analysis window 136. The type of analysis performed is indicated in the Smart Report and in the title bar as "Change Analysis". The Segment (previously defined within the Segments divider of the Business Information Setup window 132) is "Store Ages Greater than 3 Years". The Measure (previously define within the Measures divider of the Business Information Setup window 132) is "Same Store Sales". The Time Slice (previously defined in the Time Slice Considered fields of the Analyst Builder window 130) is "Year to date 1995 vs. Last Year".

The Smart Report provides a concise statement of changes that have occurred in the Primary Measure, Same Store Sales, and changes that have occurred in Measures related to the Same Store Sales, Stores Remodeled, and previously defined within the Measure Relations divider of the Business Information Setup window 132. The Smart Report then contains an explanation, including a graph, for the change in the Primary Measure, Same Store Sales.

Smart Report may include multiple instances of HTML associated with a Measure, representing hyperlinks to text data or graphic data representing the results of the Measure.

Figure 13:
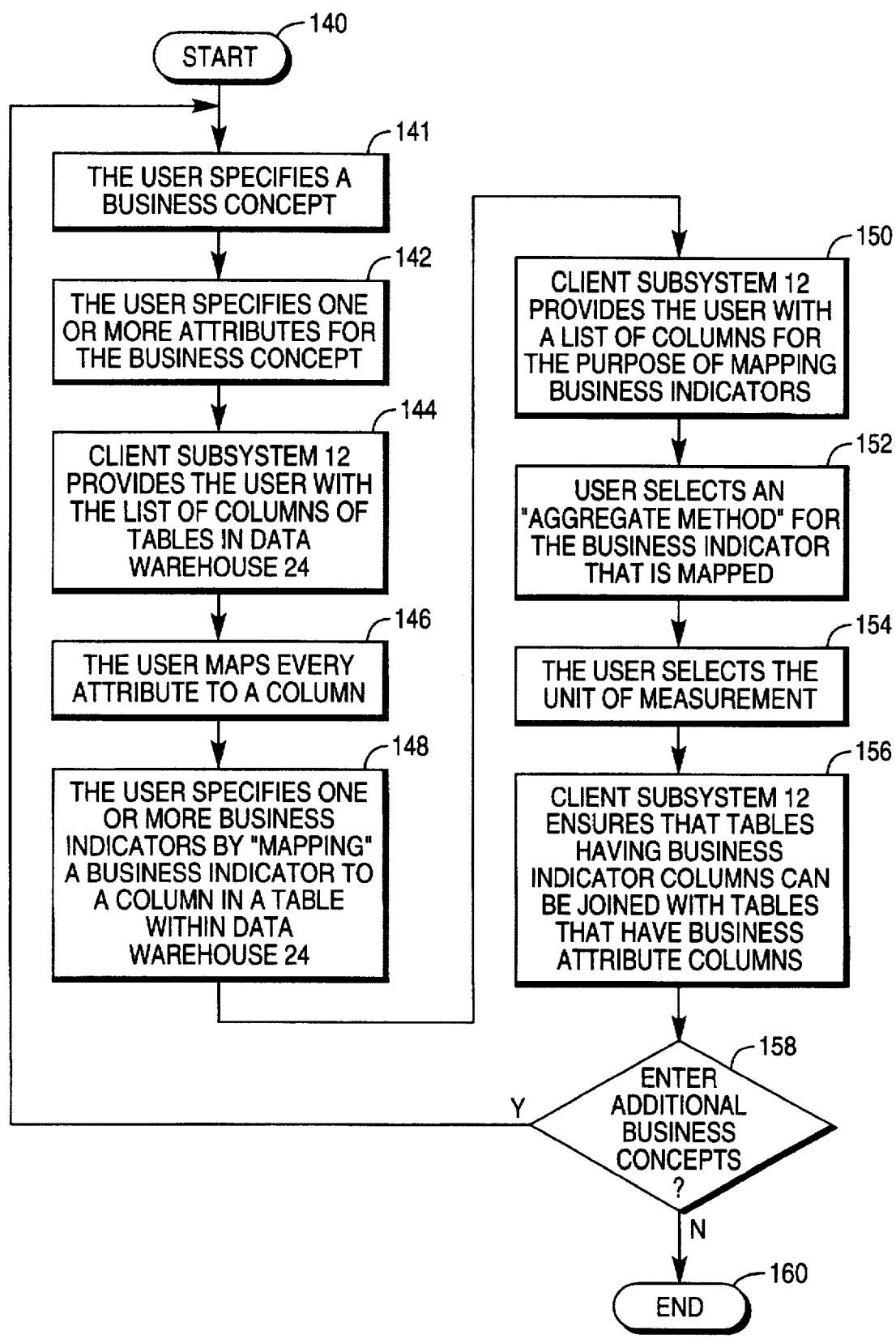
FIG. 13 is a flow diagram illustrating how metadata is created.

Turning now to FIG. 13, a method for creating metadata 25 using client subsystem 12 is illustrated beginning with START 140.

In step 141, the user specifies a Business Concept.

In step 142, the user specifies one or more attributes for the Business Concept.

In step 144, client subsystem 12 provides the user with the list of columns of tables in data warehouse 24.

In step 146, the user maps every attribute to a column. The user can provide a textual description of the business concepts and the attributes.

In step 148, the user specifies one or more Business indicators by "mapping" a Business Indicator to a column in a table within data warehouse 24.

In step 150, client subsystem 12 provides the user with a list of columns for the purpose of mapping Business Indicators as well.

In step 152, user selects an "aggregate method" for the Business Indicator that is mapped, which specifies how values for the Business Indicator are aggregated. The system supports the following aggregate methods:

Add
Average
Min
Max
Count
Last in period
First in period

In step 154, the user selects the unit of measurement, and specifies whether the Business Indicator is a currency. The user can optionally specify a plural form of the Business Indicator, a verb to describe change in the value of the Business Indicator, the precision for reporting the Business Indicator and a textual description of the Business Indicator.

In step 156, client subsystem 12 ensures that tables having Business Indicator columns can be joined with tables that have Business Attribute columns.

In step 158, client subsystem 12 determines whether the user wishes to enter additional Business Concepts. If so, the method returns to step 141. If not, the method ends at step 160.

Although the present invention has been described with particular reference to certain preferred embodiments thereof, variations and modifications of the present invention can be effected within the spirit and scope of the following claims.

What is claimed is:

1. A method of creating data types and relationships between the data types and data within a database for generating a report for a user regarding an enterprise of the user, comprising the steps of:

organizing the data within the database into columns of tables;

providing a computer coupled to the database that executes an application program that allows a user to define the data types, to define relationships between the data types, to define parameters for the report, to define a method of analysis for the report, and to create the report;

recording a business concept by the application program, the business concept being chosen by the user by operating an input device coupled to the computer;

recording an attribute associated with the business concept by the application program, the attribute being chosen by the user by operating the input device;

displaying a list of the columns of tables in the database by the computer;

recording a mapping of the attribute to one of the columns in the list, the mapping being chosen by the user by operating the input device, and creating an attribute table based upon the mapping;

displaying a list of business indicators by the computer;

recording a mapping of one of the business indicators to the column, the mapping being chosen by the user by operating the input device, and creating a business indicator table based upon the mapping; and joining the attribute table with the business indicator table to produce an additional table;

wherein the application program uses the additional table to create the report.

* * * * *